Dec. 18, 1962 L. G. HERROD 3,068,968
CONSTRUCTIONAL SYSTEMS USING SECTION STRUT MATERIAL
Filed June 11, 1959 2 Sheets-Sheet 1
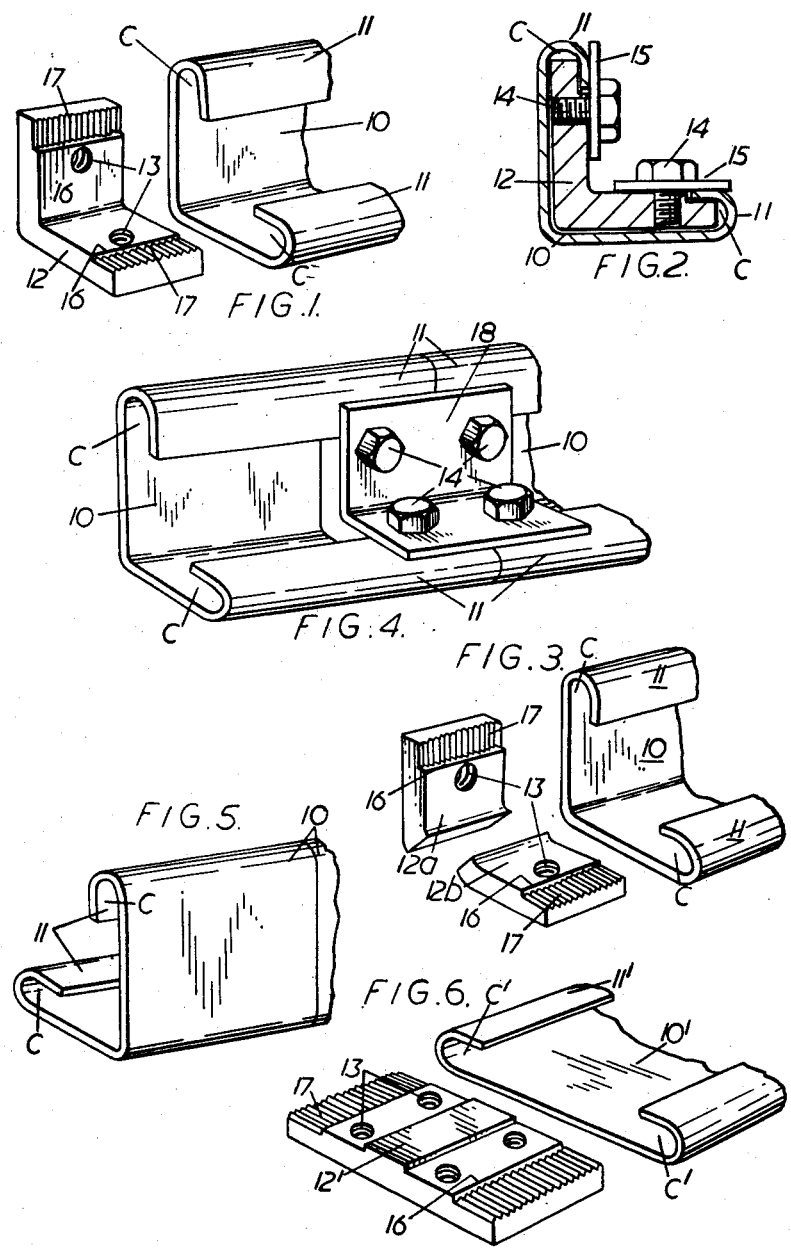
Inventor
LEONARD GRIFFIN HERROD
By
Larson and Taylor
Attorney Dec. 18, 1962 L. G. HERROD 3,068,968
CONSTRUCTIONAL SYSTEMS USING SECTION STRUT MATERIAL
Filed June 11, 1959 2 Sheets-Sheet 2
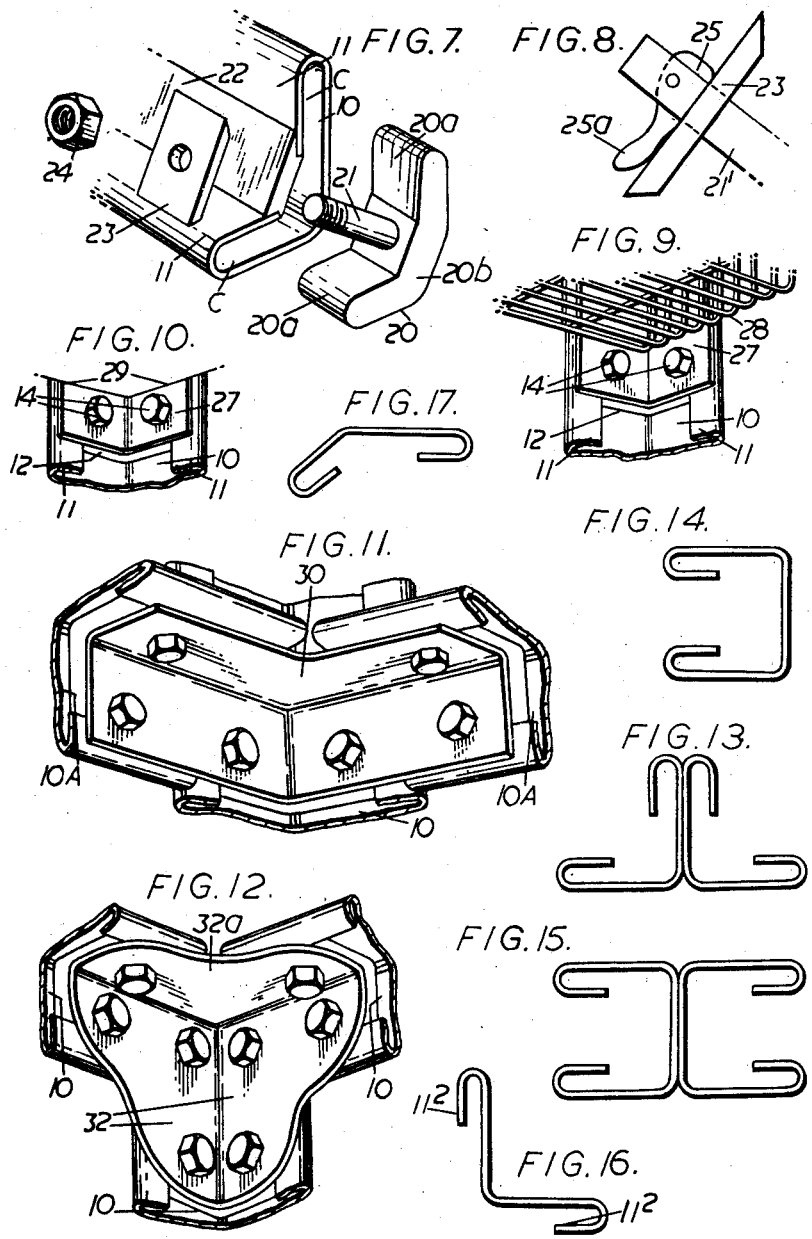
Inventor
LEONARD GRIFFIN HERROD
By
Larson and Taylor Attorney United States Patent Office 3,068,968
Patented Dec. 18, 1962

3,068,968
CONSTRUCTIONAL SYSTEMS USING SECTION
STRUT MATERIAL
Leonard G. Herrod, Hucknall, England, assignor to Ratby
Engineering Company Limited, Leicestershire, England,
a British company
Filed June 11, 1959, Ser. No. 819,752
Claims priority, application Great Britain July 1, 1958
2 Claims. (Cl. 189—36)

This invention relates to constructional systems of the class incorporating section strut material, and has reference also the separate struts and other parts for use in such systems.

In certain prior systems the struts are of angle section and at suitable short intervals along their length they are provided with slots or holes, on both halves of the section. The struts, and parts which they carry, are assembled by bolting them together through the holes or slots. While such systems are reasonably satisfactory, their use tends to be confined to industrial racking, stillages and similar equipment, mainly because the appearance of the struts is less attractive for use in shop-fitting, offices, domestic equipment and so forth.

But with the aim of providing more attractive and stronger struts, it has previously been proposed to provide strut material of suitably flanged but plain channel or box section having no holes therein and incorporating slidable nuts or cleats which co-operate with bolts or screws to secure to the struts connecting pieces or brackets. In these prior proposals, however, the strut material is of such large dimensions compared with the nuts or cleats that some form of spring is essential to initially hold each nut or cleat in position against flanges on the relevant strut and prevent the nut or cleat from dropping into the channel before the corresponding bolt or screw is tightened up. Thus, as will be appreciated, there are, in these prior systems, empty spaces of considerable dimensions between the backs of the nuts or cleats and the bottoms of the channel or box section struts.

The object of the present invention is to provide general improvements in constructional systems of the class concerned, resulting in certain advantages as will be hereinafter described.

The improved constructional system constituting this invention comprises section strut material with edges which are so folded over as to form channels along the material, cleats slidable to desired positions along the strut material and having edge portions which complement and are received in, and are dimensioned to approximately fill the cross-sectional form of, the said channels, and tightening means associated with and adapted to lock the cleats in the desired positions by pressing the outer margins of the channels into facial engagement with the opposed edge portions of the cleats and thereby clamping the latter within the channels.

The relevant edges of the strut material may be, and preferably are in most cases, folded over inwardly, in which instance the cleats, the cross-section of which conforms generally as to shape and dimensions with, i.e. complements, that of the strut material are arranged to slide within the struts.

The said edges of the strut material may, however, be folded over outwardly, in which case the cleats, again conforming in cross-section to the section of the struts, are slidable on the outside of the latter.

Moreover, in the preferred embodiments of the invention (although there is no limitation in this respect), the strut material and the slidable cleats are of respectively complementary angle sections. In this connection, therefore, the improved system may be regarded as one comprising struts and cleats of interfitting sections, with the angle section cleats located either within or on the outside of the complementary angle section struts.

In any event, the cleats, conforming generally in cross-sectional shape and dimensions with the cross-section of the strut material, are, in effect, self-supporting and do not require springs to hold them in position initially.

Various constructional forms of the invention will now be described, by way of example, with reference to the accompanying drawings, wherein, FIGURE 1 is a perspective view of a simple angle section strut and cleat shown separated, i.e. before being interfitted, FIGURE 2 is a cross-section showing these parts assembled, FIGURE 3 is a view similar to FIGURE 1 but illustrating a pair of half cleats which can be inserted into a strut at a location between two existing fixed cleats, FIGURES 4 and 5 are two further perspective views, respectively, from the inside and the outside of the strut material, showing the method of joining together in alignment two angle section struts, FIGURE 6 is a perspective view similar to FIGURE 1 showing a flat section strut and cleat, FIGURE 7 is a perspective view depicting a modification in which the bolts and the cleats are formed integrally, FIGURE 8 is a detail elevational view of a tightening device, FIGURES 9, 10, 11 and 12 are fragmentary detail views of corner portions of assembled structures incorporating vertical and horizontal connections with gussets of various forms, hereinafter to be described, FIGURES 13–17 illustrate alternative strut sections.

Referring to FIGURE 1 it will be seen that the angle-section strut 10 has marginal edges 11 which are so folded over inwardly as to form longitudinal channels C which are co-extensive with the strut. The outer margins of the channels C are in this case in the nature of inturned flanges which are spaced apart from and extend parallel to the opposed portions of the body of the strut. For use with such a strut there are provided angle-section cleats such as 12. The cross-section of each cleat 12 conforms generally, as to shape and dimensions with, i.e. complements, that of the strut 10. Each cleat, in this example, is slidable within the angle-section strut 10 with its marginal edge portions received in and slidable along the channels C. As will be seen in FIGURE 2, these marginal edge portions of the cleats 12 are dimensioned to approximately fill the spaces between the opposed walls of the said channels. The edge portions of the cleats are stepped or rebated at 16 to receive the outer margins of the channels C, and to avoid any tendency of the cleats to slip when the parts are tightened up, the outer faces 17 of these marginal edge portions, which are to be pressed upon by the outer margins of the channels C, are serrated, knurled, grooved, milled or provided with equivalent surface formations. Each of the cleats 12 has formed therein tapped holes 13 to receive tightening bolts 14. The heads of the bolts extend partially over the folded-over edges 11 of the strut 10. If desired, securing members, such as the plates or strips 15 represented in FIGURE 2, may be fitted on to the bolts and interposed between the heads thereof and the outer margins of the channels C. The securing plates or strips, when provided, may serve to hold in position any desired parts or attachments. In any event, when the bolts 14 are screwed home, the cleats 12 will be locked in their desired positions by virtue of the inner surfaces of the outer margins of the channels C being pressed into facial engagement with the opposed serrated or equivalently formed portions 17. In this way the cleats are clamped within the channels C by tightening forces exerted at right angles to the other margins of these channels.

In FIGURE 3, the illustrated cleat is made in two halves 12a, 12b, instead of in one piece, each half being adapted to fit separately into the corresponding portion of the angle section strut 10. As a consequence, the two halves can be inserted at any location along the strut, e.g. between two existing fixed cleats, without having to be inserted from the end of the strut.

FIGURES 4 and 5 show the junction of two struts end to end with the aid of a gusset 18 which overlaps both struts and has four bolts 14 passed through it and through a pair of cleats, one in each strut. The neatness of the joint from the outside of the struts 10 is seen in FIGURE 5.

FIGURE 6 shows a flat section strut 10' with inwardly directed folded over edges 11' and a flat cleat 12', the parts being otherwise similar to those shown in FIGURES 1 and 2.

In FIGURE 7, the cleat 20 and the bolt 21 are formed as an integral unit, being in effect a bolt with a special head. The outer portions 20a of this head 20 are shaped to slide in the two relatively angularly disposed channels C of the angle section strut 10. The outer portions 20a are connected by an intermediate portion 20b disposed at an angle of 45°. A securing plate 23 fitted on to the shank of the bolt 21 is tightened down by a nut 24 screwed on to the bolt.

If desired, and as shown in FIGURE 7, a separate fillet such as 22, may be fitted across the angle of the strut 10 to hide the edges of the outer margins of the channels C at the inner side of the strut, this fillet being held in place by the folded-over edges 11.

FIGURE 8 shows an alternative tightening device in the form of a cam 25 which is pivotally mounted on an extension of a shank 21' and having a handle 25a by which the cam can be operated to press down tightly on the plate 23.

FIGURE 9 shows an angle section strut 10 disposed vertically and furnished with a corner gusset 27 carrying a wire basket 28. This gusset is secured by only two bolts 14 screwed straight into an angle section cleat 12. FIGURE 10 shows a similar arrangement supporting a horizontal shelf 29.

FIGURE 11 shows an assembly in which it is desired to support two shelves or the like meeting in a right angle. The shelves are now shown but are carried by a vertical angle section strut 10 and two horizontal struts 10A, all connected together by cleats similar to those shown in FIGURE 1, and a gusset of the shape indicated at 30. This gusset is not only itself of angle section but is also of right-angular form.

FIGURE 12 shows a somewhat similar assembly designed for the top of a structure, in which the gusset 32 is of a box-like form, including a top horizontal portion 32a.

The strut material may be of any suitable section. Angle section and flat section examples have already been described. Such material may, however, be of joist section. Other possible forms are shown in FIGURES 13 to 17. Thus, FIGURE 13 depicts a double angle or T-section. FIGURE 14 shows a channel-section version of the strut material whilst FIGURE 15 illustrates a double channel section with the channels back to back. FIGURE 16 shows angle section strut material with the relevant edges 11² folded over outwardly, i.e. in the opposite direction to the edges 11 in FIGURE 1, and FIGURE 17 represents strut material of an obtuse angle section. The sides of the angle in FIGURE 17 are unequal, although there is no limitation in this respect.

It is to be clearly understood that it is not always necessary to provide gussets, stays, brackets or the like for the support or attachment of shelves, wire baskets, platforms, racks, and so on. In some cases such members or components may be fastened direct to the struts. Gussets and the like are, however, usually desirable in the case of heavier work.

In some cases, cleats for fitting to the bottom of an assembled structure, may have special features attached to or formed integral with them, for example feet of, say, flat or pyramidal form, or feet furnished with either castors or fixed wheels.

The invention is not limited to any particular materials for the struts, cleats, gussets and so forth. They may be made of steel, or non-ferrous metal such as aluminium, or any other appropriate metal or alloy, or of suitable plastic or other materials, or of metal with a plastic e.g. P.V.C. coating, according to the purposes for which they are intended. For instance if the struts are to act as glazing bars for carrying glass panels or panes, the cleats may be of a flexible material.

The invention provides a constructional system in which only the plain faces of the struts are visible, the cleats and their securing bolts or the like being usually on the inside of the struts. Moreover, the struts have no raw edges and no holes therein. Thus, a very pleasing appearance is obtainable which considerably enlarges the field in which the system can be used. At the same time a very positive lock is obtained and the parts provide a firm and rigid assembly.

The system, which readily lends itself to panelling, also provides a "do-it-yourself" kit from which racks, shelves, cabinets and the like can be easily and neatly assembled for use in works stores, offices and shops. By virtue of the strut material being preferably cold rolled to its characteristic shape and not being perforated or drilled in any way, it is stronger and less expensive to produce than conventional material. Adjustments to the heights of racks, cabinets and the like can be made easily and to within fine limits.

I claim:

1. In combination with a strut of right angular cross-section the axially extending edge portions of which are folded over reentrantly to form spaced interior channels, a cleat of corresponding right angular cross-section disposed in the interior of the strut, said cleat having a cross-sectional width substantially greater than that of the space separating the strut channels and a thickness at its axially extending edge portions substantially equal to that of the strut channels so as to slidably engage the opposing walls of each strut channel, said cleat also having means connected therewith defining a stepped center portion slidably engaged between the axially extending edges of the strut and a serrated face on each axially extending edge portion, and lock means for causing pressure engagement between the serrated face of at least one of the axially extending edge portions of the cleat and at least one of the opposing walls of each strut channel.

2. In combination, section strut material of right angular cross-section, the axially extending marginal edge portions of which are folded over re-entrantly to form two spaced interior channels along the material, corresponding right angular cross-section cleats disposed in the interior of the strut, each of said cleats having a width greater than the space separating the strut channels, each of said cleats having a right angular cross-section which conforms generally as to dimensions with that of said strut material, and including edge portions which complement, are received in, and approximately fill the cross-sectional form of the said two strut channels so as to slidably engage the opposing walls of each strut channel, and at least one securing member associated with the said cleats, the turned-over edge portions being interposed between a cleat and the associated securing member, and locking means adapted to urge the cleats and the associated member towards one another so that the interposed folded-over edges are gripped between the member and the cleats and the outer faces of the edge portions of the cleats are pressed into engagement with the opposed inner faces of the folded-over edge portions.

References Cited in the file of this patent

UNITED STATES PATENTS

| | | |
|---|---|---|
| 793,710 | Barnett | July 4, 1905 |
| 2,904,360 | Gamlen | Sept. 15, 1959 |

FOREIGN PATENTS

| | | |
|---|---|---|
| 494,162 | Belgium | June 16, 1950 |
| 782,428 | Great Britain | Sept. 4, 1957 |